United States Patent [19]
Freudenberg et al.

[11] Patent Number: 5,273,263
[45] Date of Patent: Dec. 28, 1993

[54] HYDRAULICALLY DAMPED RUBBER MOUNTING WITH EDDY CURRENT SUPPRESSION

[75] Inventors: Ulrich Freudenberg, Hirschberg; Tillman Freudenberg, Weinheim, both of Fed. Rep. of Germany

[73] Assignee: Firma Carl Freudenberg, Weinheim/Bergstr., Fed. Rep. of Germany

[21] Appl. No.: 923,290

[22] Filed: Jul. 31, 1992

[30] Foreign Application Priority Data

Aug. 20, 1991 [DE] Fed. Rep. of Germany ....... 4127502

[51] Int. Cl.$^5$ .................... F16F 13/00; B60K 5/12
[52] U.S. Cl. .................... 267/140.14; 267/219
[58] Field of Search ............ 267/140.11, 140.13, 267/140.14, 140.15, 219; 248/550, 562; 180/300

[56] References Cited

U.S. PATENT DOCUMENTS

| | | | |
|---|---|---|---|
| 4,759,534 | 7/1988 | Härtel | 267/140.14 |
| 4,793,599 | 12/1988 | Ishioka | 267/140.14 |
| 4,893,800 | 1/1990 | Tabata | 267/140.14 |
| 4,973,031 | 11/1990 | Takano et al. | 267/140.14 |
| 5,000,299 | 3/1991 | Goto et al. | 267/140.14 |
| 5,042,786 | 8/1991 | Freudenberg et al. | 267/140.14 |

FOREIGN PATENT DOCUMENTS

| | | |
|---|---|---|
| 3918753 | 7/1990 | Fed. Rep. of Germany . |
| 63-1833 | 1/1988 | Japan ............... 267/140.14 |
| 112044 | 4/1989 | Japan ............... 267/140.14 |

*Primary Examiner*—Matthew C. Graham
*Attorney, Agent, or Firm*—Kenyon & Kenyon

[57] ABSTRACT

A controllable rubber bearing with a hydraulic damping device, in which a fluid-filled working space is limited by a plate of magnetizable material. The plate is supported on a spring at least partially. The plate can be moved back and forth in the direction of the working space, as a function of preset parameters, using a magnet system. The support element comprises at least two opposite partial elements at least within the axial expanse of the magnet coil, which are separated from one another by an electrically insulating layer. The insulating layer extends parallel to the direction of motion of the plate and is essentially perpendicular to at least one groove of the support element, which can be made of soft iron or a moldable magnetizable material.

12 Claims, 7 Drawing Sheets

HYDRAULICALLY DAMPED RUBBER MOUNTING WITH EDDY CURRENT SUPPRESSION

FIELD OF THE INVENTION

The present invention relates to a controllable rubber bearing with a hydraulic damping device. The bearing has a fluid-filled working space which is limited, in at least a partial region, by a fluid-impermeable plate of magnetizable material. The plate is supported on a spring and can be moved back and forth in the direction of the working space. A magnet coil is arranged on the side of the plate facing away from the working space and is separated from the plate by an air gap. The magnet coil is held in a groove in a support element made of soft iron or another magnetizable material.

DESCRIPTION OF RELATED ART

A rubber bearing is shown in German Patent No. 39 18 753 (corresponding to U.S. Pat. No. 5,042,786). In this bearing, a permanent magnet and a magnet coil are structured to be immobile relative to one another, and are attached to the housing of the rubber bearing in a rigid manner. The permanent magnet and the magnet coil together form a lift magnet. This lift magnet is arranged in a one-piece support element.

In the bearing shown in German Patent No. 39 18 753, the support element is manufactured from a one-piece solid part, because this type of part is particularly easy and cost-effective to manufacture. However, this structure is disadvantageous because eddy currents can form in the solid part, which can use up large amounts of electric power and reduce the force effect of the magnet at higher frequency ranges.

SUMMARY OF THE INVENTION

The present invention is based on the need to suppress the above described eddy currents in the most cost-effective manner possible. In particular, the design conditions inherent in rubber bearings must be taken into consideration, such as the need for a small construction space. This space should preferably be circular.

In the controllable rubber bearing according to the present invention, the support element comprises at least two opposed partial elements within the axial expanse of the magnet coil. These partial elements are separated from one another by an electrically insulating layer, which extends parallel to the direction of motion of the plate and essentially perpendicular to the groove. The division of the support element into at least two partial elements within the axial expanse of the magnet coil results in the reduction of eddy currents. Reduction of eddy currents prevents temperature increases in both the fluid-filled working chamber and the expansion spring adjacent to it. Low level temperatures which remain essentially constant prevent the occurrence of steam bubbles and prevent a change in the spring properties of the elastomeric material of the expansion spring. The useful life of the bearing is thus increased, with a simultaneous improvement of the properties of the bearing.

If the lift magnet is formed by a permanent magnet, thermally less stable but stronger magnet materials can be used. If the bearing is structured according to another embodiment, without a permanent magnet, significant advantages are also obtained. This is because the bearing can be used in thermally disadvantageous situations because of its own low inherent heating, and because it makes fewer demands on the electrical supply.

The fluid-impermeable plate, which is attached to a spring, is situated close to the support element and the magnet coil arranged in the support element, leaving a slight gap. The spring stiffness of the spring holding the plate is greater than that of the expansion spring, which is directly connected with the support and the attachment thread affixed to the support. Using the magnet coil, varying forces can be generated, in order to cause the plate to vibrate. These vibrations are transferred to the carrier element and the expansion spring via the fluid in the working space. The result is that the bearing expands and contracts synchronously with the vibrations. This causes the spring to be compressed, which can give static support while the spring no longer demonstrates any dynamic spring rate. It is advantageous if the support element, which consists of at least two parts, can be inexpensively produced and easily assembled. Furthermore, the magnet coil is mounted in a fixed manner, which guarantees simple power feed to the magnet coil. The spring holding the plate can be structured as a blade spring. This spring has a spring rigidity with an axial stress in every operating state in the direction of the support element such that a gap is present between the support element holding the magnet coil and the plate attached to the spring. To deflect the plate, the required alternating voltage is fed to the magnet coil from a supply unit outside the bearing.

Furthermore, the bearing contains a damping opening which connects the working space with the equalizing space and thus damps the relative movements between the carrier bearing and the support element.

The electrically insulating layer between the two partial elements which form the support element can consist of a solid material. For example, a varnish, an oxide, or a phosphate layer can be provided, in order to separate the two partial elements from one another. This arrangement is easy to produce, allows easy assembly, and a bearing structured in such a manner can be economically produced in large numbers. It is possible to further reduce the temperature of the controllable rubber bearing by using several partial elements separated by electrically insulating layers. The greater the number of partial elements insulated from one another that form the support element, the fewer the eddy currents which can form to increase the temperature of the bearing.

The electrically insulating layer can consist of an air-filled intermediate space which separates the partial elements from one another. It is advantageous in this arrangement that the partial elements are not separated by a non-conductive layer. This configuration often results in lower production costs, in comparison with the use of an insulating coating on the partial elements.

The partial elements can consist of consecutive segments of a continuous sheet-metal strip which surround one another in spiral form. This embodiment of the support element prevents the formation of eddy currents in a particularly effective manner, and results in correspondingly small wall thicknesses and a large number of spiral windings. The insulating layer between the two partial elements which surround one another in this arrangement is very thin. Within the scope of the present invention, a strip coated on one side can be used, which is particularly economical to produce. For other embodiments, strips coated on both sides, or strips of different materials, can also be provided.

In another embodiment, the partial elements consist of sheet-metal strips which concentrically enclose one another and which have at least one aperture in the radial direction. The number of sheet-metal strips which concentrically enclose one another is selected as a function of the maximum permissible heat formation in the bearing, such that they do not cause a problem either for the fluid in the working space or for the expansion spring which limits the working space. The circular sheet-metal strips can be coated, for example, using a dipping process. In the embodiment using sheet-metal strips which enclose one another, the usage properties and the useful life of the bearing are enhanced due to low temperatures.

In a further embodiment, the partial elements consist of sheet-metal plates of constant thickness, combined into a package. In this embodiment, the sheet-metal plates can surround the center of the magnet coil in an involute form. Due to the extraordinarily high number of partial elements which are electrically insulated from one another, the formation of eddy currents is reduced to a great degree. This structure results in hardly any temperature increase inside the bearing.

In another embodiment, the partial elements are formed by columns that extend parallel to one another and which are connected with one another at the ends facing away from the plate, outside the axial expanse of the magnet coil. It is essential that the columns which extend parallel to one another are not connected in the region of the axial expanse of the magnet coil. For simpler assembly, the columns can be connected with one another on the side facing away from the plate. It is possible that the columns can be connected with one another before assembly of the bearing, by a separate connection element. The columns can also consist of projections on the support element and can be formed to pass over into one another in one piece, at the side of the magnet coil facing away from the plate.

The partial elements can also be formed by particles of a powder, which are glued together by a binder of an electrically insulating polymeric material. The partial elements can be glued together in the form of a molded piece which forms the support element. The one-piece structure of the molded part significantly simplifies assembly. The particles must be designed, in size and arrangement, so that the formation of eddy currents is effectively prevented. The size of the particles should be in the micrometer range, so that the molded part has a density approximating that of an iron part.

BRIEF DESCRIPTION OF THE DRAWINGS

The invention will be explained further in the following, on the basis of the attached drawings.

DESCRIPTION OF THE PREFERRED EMBODIMENTS

Figure 1A:
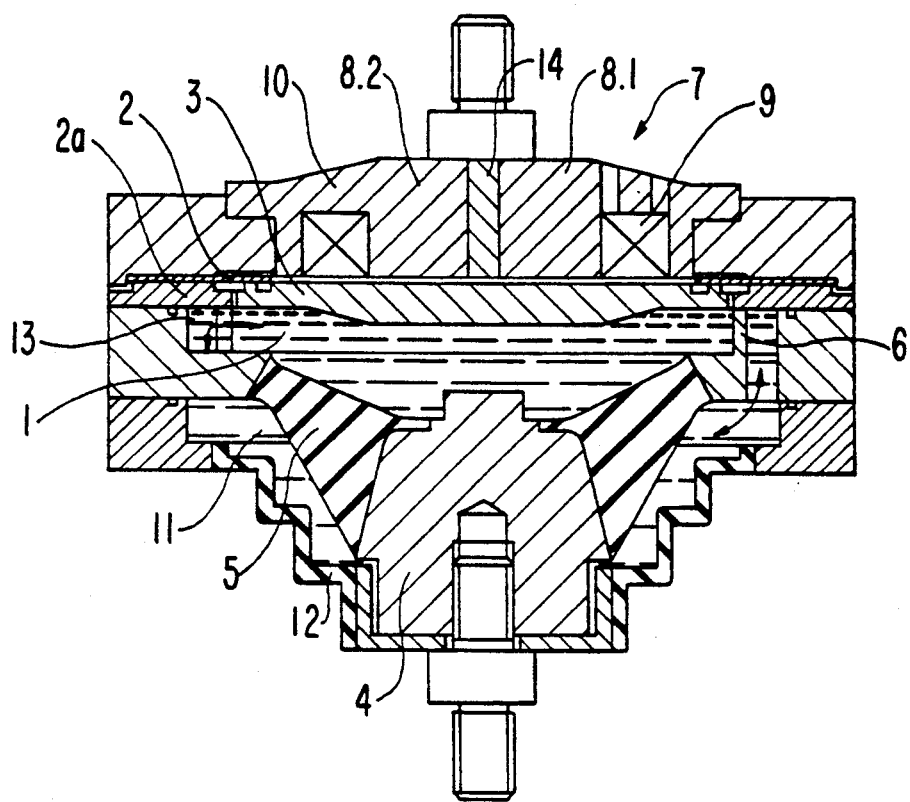
FIGS. 1 and 1a show a controllable rubber bearing according to the present invention, with a two-part support element and an electrically insulating layer of a solid material.
Figure 1B:
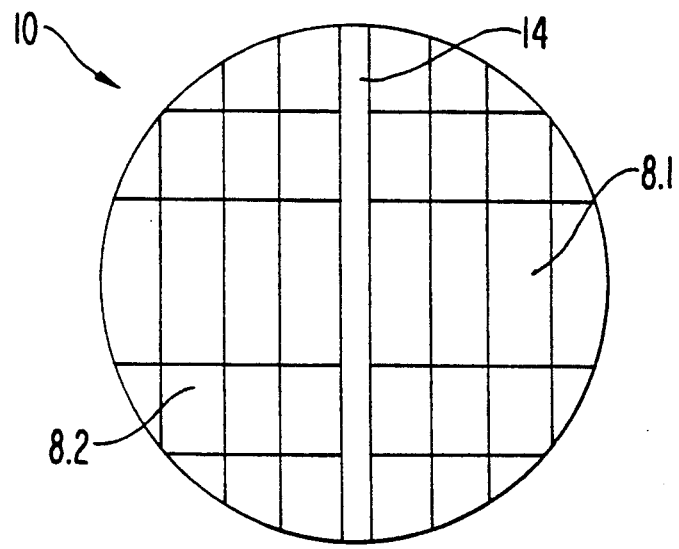

The rubber bearing shown in FIG. 1 is intended for use in a motor vehicle. The bearing comprises a carrier element 4, which is screwed onto the body of the motor vehicle during intended use, and which to supports the expansion spring 5, structured as a hollow cone and made of a rubber-like elastic material.

The expansion spring 5 and the carrier element 4 as well as the housing 6 of the rubber bearing are permanently connected to each other, for example by direct vulcanization of the expansion spring 5 onto the adjacent components, which are made of metal. The housing 6 is closed on the bottom and is connected with the internal combustion engine to be supported during intended use. The support element 10 consists of at least two opposite partial elements 8.1, 8.2, which are separated from one another by an electrically insulating layer 14. Support element 10 has a groove in which the magnet coil 9 is rigidly fixed in place. In other embodiments, the two partial elements 8.1, 8.2 can be further subdivided, where these additional partial elements are separated from one another by electrically insulating layers. The finer the subdivision into individual partial elements, the more effectively eddy currents and the higher temperatures accompanying these currents can be avoided. The electrical power usage of the bearing is reduced by such a structure.

Below the two-part support element 10, in the region outside the circumference of the partial elements 8.1 and 8.2, a circular blade spring 2 is mounted. Blade spring 2 engages behind the plate 3. Plate 3 consists of soft iron and supports blade spring 2 in the direction of the magnet coil 9, in the region of the inner circumference of coil 9. The blade spring 2 can bias the plate 3 in the direction of the fluid-filled working space 1. The part 2a which clamps the blade spring 2 is connected to the plate 3 in fluid-sealed manner.

The working space 1 is limited by the plate 3, the housing 6, the expansion spring 5 and the carrier element 4. The working space 1 is connected to the equalizing space 11, which is limited by a folded bellows 12, via a damping opening 14. The folded bellows 12 is flexible and resilient and allows pressure-free take-up of additional liquid volumes in the equalizing space 11. The damping opening 13 can be arranged in the wall of the housing 6 and is structured in the form of a channel in the embodiment shown in FIG. 1. It is advantageous if the cross-section of the opening 13 is designed in response to the elasticity of the expansion spring 5 so that when vibrations of a frequency to be damped are initiated, a resonant movement of the fluid volume results. This results in particularly good damping.

The structure of the support element 10 is such that it has at least two parts, the partial elements 8.1, 8.2, which results in an interruption of eddy currents. This interruption reliably prevents temperature increases, which could reduce the useful lifetime of the bearing. The smaller the support element 10 is divided, into partial elements 8.1, 8.2, . . . , 8.n separated from one another by electrically insulating layers 14, the fewer eddy currents which are formed. The electrically insulating layer can consist of a solid material, or of an air-filled intermediate space, as shown in FIG. 2.

Figure 2A:
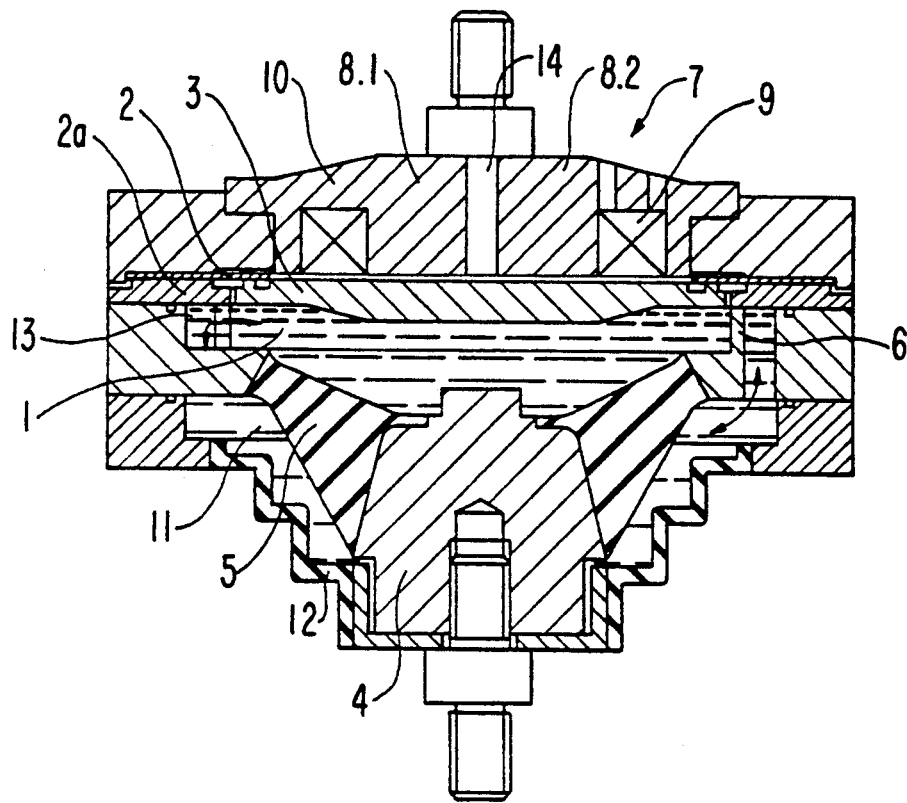
FIGS. 2 and 2a show a bearing according to the embodiment of FIG. 1, where the electrically insulating layer is formed by an electrically insulating air gap.
Figure 2B:
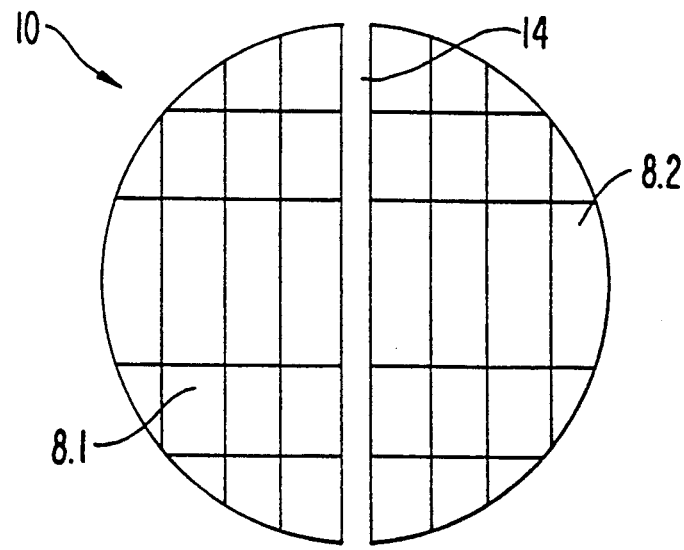

The bearing shown in FIG. 2 corresponds to that shown in FIG. 1, but the electrically insulating layer 14 is formed by an air-filled intermediate space located between the two partial elements 8.1, 8.2.

FIGS. 3, 4, 5, 6 and 7 represent other embodiments of the multi-part support element 10 of FIGS. 1 and 2.

Figure 3:
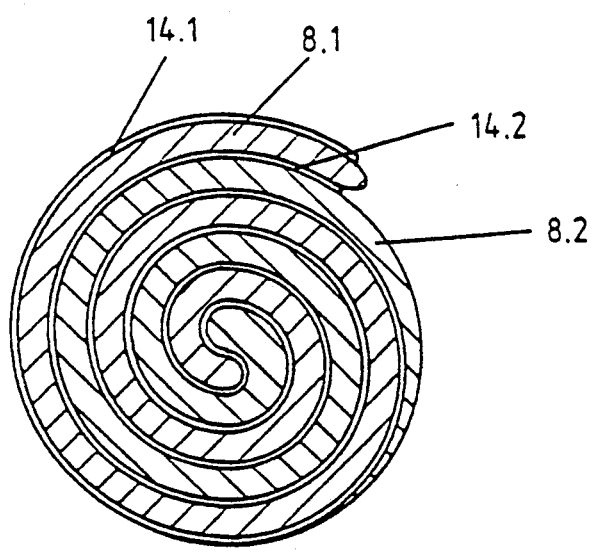
FIG. 3 shows a support element which is formed by two partial elements, where the two partial elements consist of consecutive segments of a continuous sheet-metal strip which surround one another in spiral form.

FIG. 3 shows two partial elements 8.1, 8.2 which consist of consecutive segments of a continuous sheet-metal strip which surround one another in a spiral form. In this case, a thin-walled coating 14.1, 14.2 of an electrically insulating material is provided as the insulating layer 14, which encloses the partial element 8.1 on both sides, along its circumferential surfaces. This coating 14.1, 14.2 can be produced, for example, by dipping the partial element 8.1 in an insulating material. The second partial element 8.2, which in this embodiment does not have any electrically insulating coating, is arranged in the spiral channels of the first partial element 8.1. In addition to the two-part version shown in FIG. 3, multi-part versions are also possible; these must, however, be separated from one another by an electrically insulating layer. The formation of eddy currents and the related increase in temperature can be reduced with an increasing number of sheet-metal strips which surround one another in a spiral form.

Figure 4:
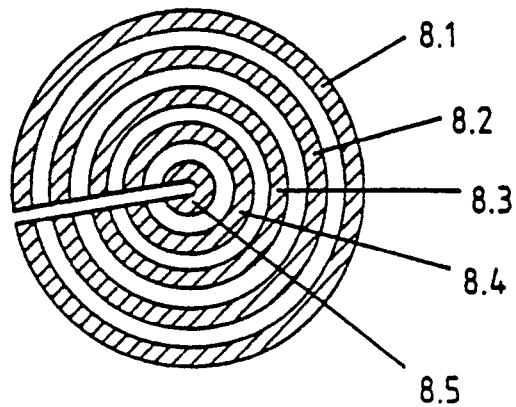
FIG. 4 shows partial elements which consist of sheet-metal strips which concentrically enclose one another.

FIG. 4 shows circular sheet-metal strips 8.1–8.5, which have different diameters and concentrically enclose one another. The sheet-metal strips 8.1–8.5 are slit at least once in the radial direction. In FIG. 4, the electrically insulating layer consists of an air gap, but the sheet-metal strips can also be coated in the manner shown in FIG. 3. With an increasing number of sheet-metal strips, the risk of eddy current formation is reduced.

Figure 5:
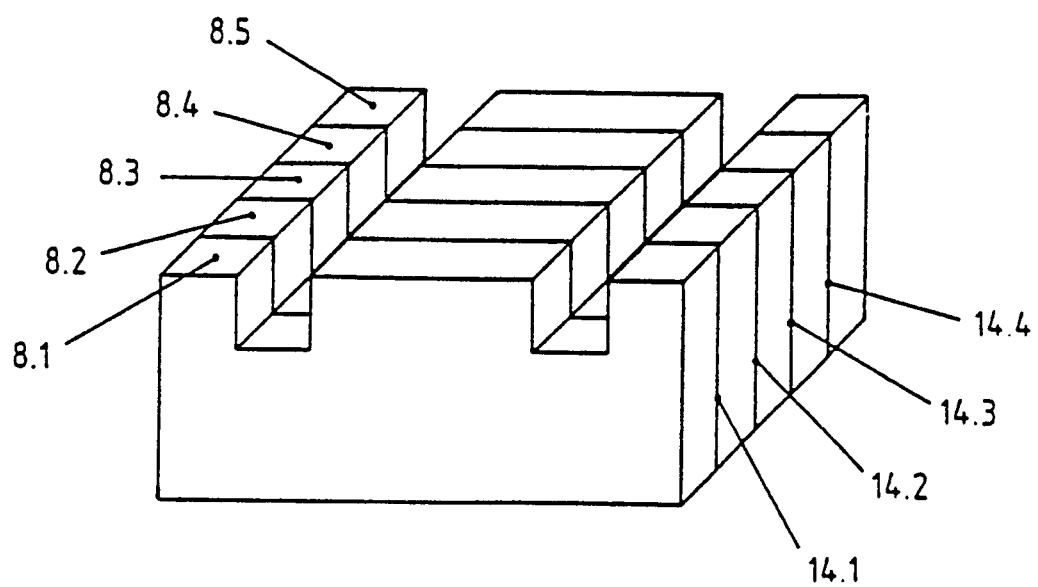
FIG. 5 shows partial elements which consist of sheet-metal plates of constant thickness, combined into a package.

In the support element shown in FIG. 5, the individual partial elements 8.1–8.5 are in the form of sheet-metal strips. These strips 8.1–8.5 are particularly easy to manufacture, and therefore are particularly economical. The individual sheet-metal strips are separated from one another by an insulating coating 14.1–14.4 in each instance. The embodiment shown in FIG. 5 merely represents an example. Thus it is also possible to provide two adjacent coils arranged parallel to one another in a similarly structured support element. This structure results in a relatively reduced space requirement in the region of the deflection from one groove to the other. A change of the grooves in the region of their ends can also lead to a reduction of the required construction space, for example if the ends of the grooves are brought together.

Figure 6:
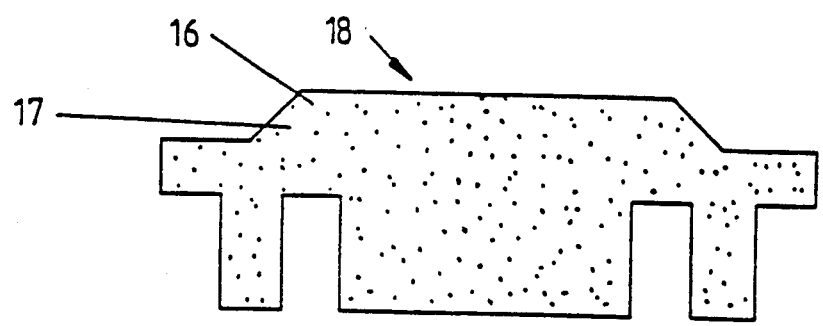
FIG. 6 shows a support element structured as a molded piece, which consists of a polymeric material in which electrically insulated particles of an electrically conductive powder are arranged.

FIG. 6 shows a one-piece support element 10 which consists of a molded piece 18. This molded piece 18 is formed by particles 16 of an electrically and magnetically conductive powder. The powder is glued together by a binder 17 of polymeric material in an electrically insulating manner. The size of the particles 16 are in the range of a few micrometers. The molded part has a density which is only slightly different from that of a molded part made of iron, if the particles used are iron particles. The assembly of such molded parts 18 into controllable rubber bearings is particularly simple.

Figure 7:
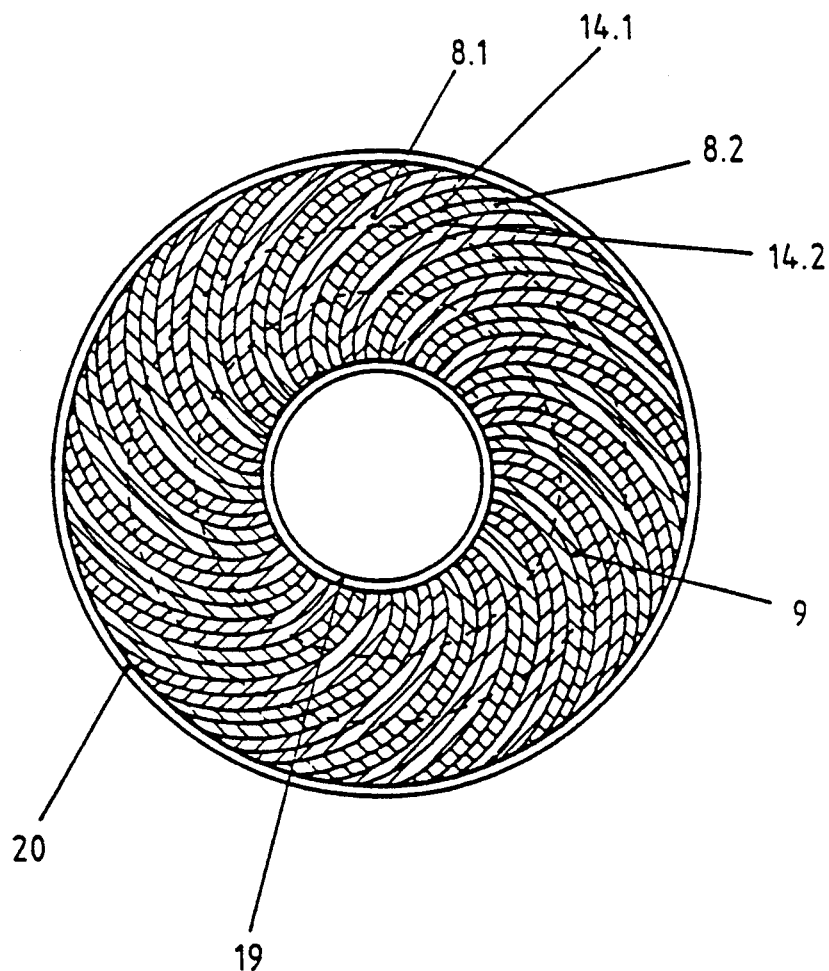
FIG. 7 shows a support element whose partial elements are formed by sheet-metal strips which are connected with each other in a non-conductive manner and are affixed to an inner ring and an outer ring of aluminum.

FIG. 7 shows schematically a support element whose partial elements 8.1, 8.2, etc. are in the form of sheet-metal plates with a constant thickness. These plates have an involute form and are affixed between an inner support ring 19 and an outer support ring 20. The region of the groove, in which the magnet coil 9 is later arranged, is represented with broken lines. The inner and the outer support ring 19, 20 consist of a non-magnetizable material. The insulating layers 14.1, etc. are structured to be very thin.

Figure 8A:
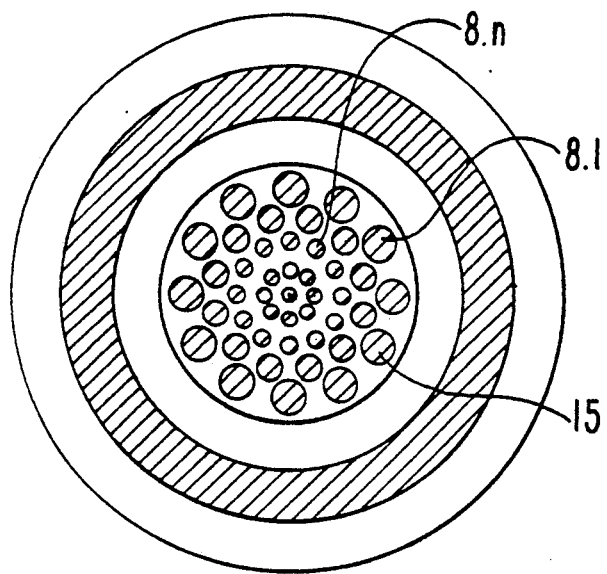
FIGS. 8a and 8b show a support element whose partial elements are formed by columns connected to one another outside of the axial extent of the magnet coil.
Figure 8B:
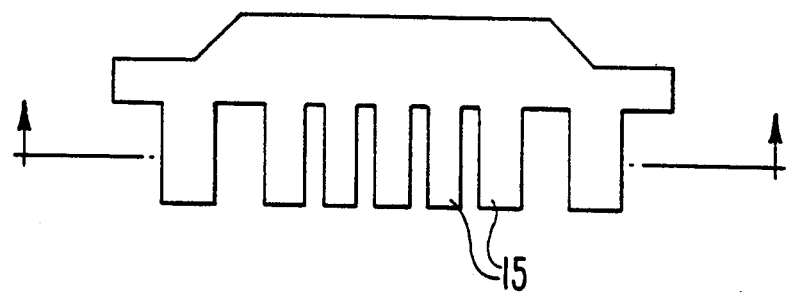

FIGS. 8a and 8b show a support element whose partial elements 8.1, . . . , 8n consist of columns 15. The columns 15 extend parallel to one another, and are connected to one another outside of the axial extent of the magnet coil 9. The columns are electrically insulated from one another via either an air gap or an electrically-insulating material placed between the columns. As many columns as possible are arranged in the available space such that they are of sufficient cross-section so that they can still support the coil and be magnetized.

We claim:

1. A controllable bearing comprising:
   a spring;
   a magnetizable plate, said plate being fluid impermeable, said plate and said spring cooperating to define a working space, said plate being movably mounted on said spring to allow movement to and away from said working space;
   a magnet coil adjacent said plate on a side of said plate opposite said working space, said coil being separated from said plate by an air gap;
   a support element, said support element comprising a groove, said coil being held in said groove, said support element being constructed of at least two opposed elements, said opposed elements being separated from one another by an electrically insulating layer extending parallel to the direction of motion of the plate.

2. The controllable bearing of claim 1, wherein said electrically insulating layer comprises a solid electrically insulating material.

3. The controllable bearing of claim 1, wherein said electrically insulating layer comprises an air-filled space.

4. The controllable bearing of claim 1, wherein said opposed elements comprise a plurality of sheet metal strips surrounding one another in a spiral.

5. The controllable bearing of claim 1, wherein said opposed elements comprise a plurality of sheet metal strips surrounding one another concentrically, said strips including at least one radial gap.

6. The controllable bearing of claim 1, wherein said opposed elements comprise a plurality of sheet metal strips stacked parallel to one another.

7. The controllable bearing of claim 1, wherein said opposed elements comprise a plurality of sheet metal strips surrounding the center of the coil in an involute form.

8. The controllable bearing of claim 1, wherein said opposed elements comprise a plurality of columns extending parallel to one another.

9. The controllable bearing of claim 8, wherein said columns are connected to one another at ends of said columns facing away from the plate, in an area outside the axial expanse of the magnet coil.

10. The controllable bearing of claim 9, wherein said columns comprise projections of the support element and pass over one another in one piece on the side of the magnet coil facing away from said plate.

11. The controllable bearing of claim 1, wherein said opposed elements comprise particles of a magnetizable material which are bonded together with an electrically insulating polymeric material.

12. The controllable bearing of claim 1, wherein the opposed elements are bonded together to form a unitary molded piece.

* * * * *